Jan. 11, 1949.  P. A. PITT ET AL  2,458,635
EXPANSION JOINT FOR EXHAUST STRUCTURES
Filed July 10, 1945  2 Sheets-Sheet 1
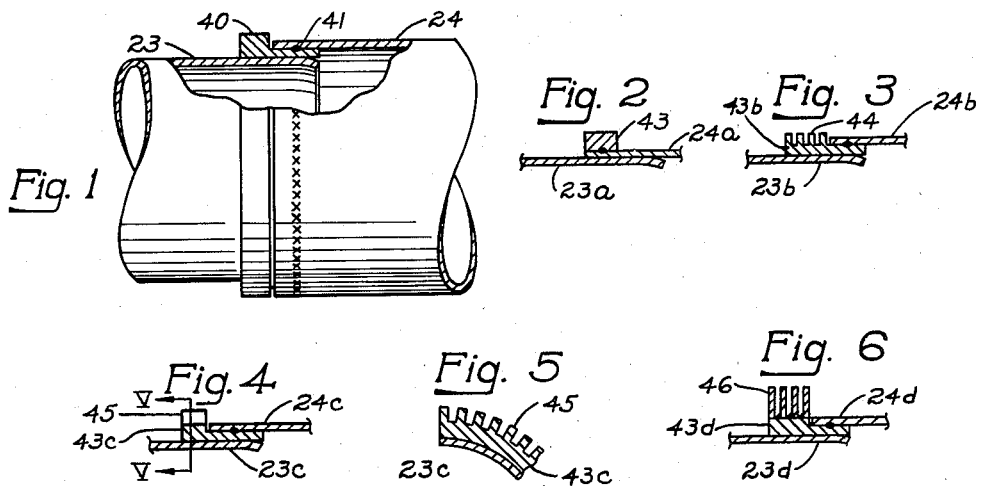
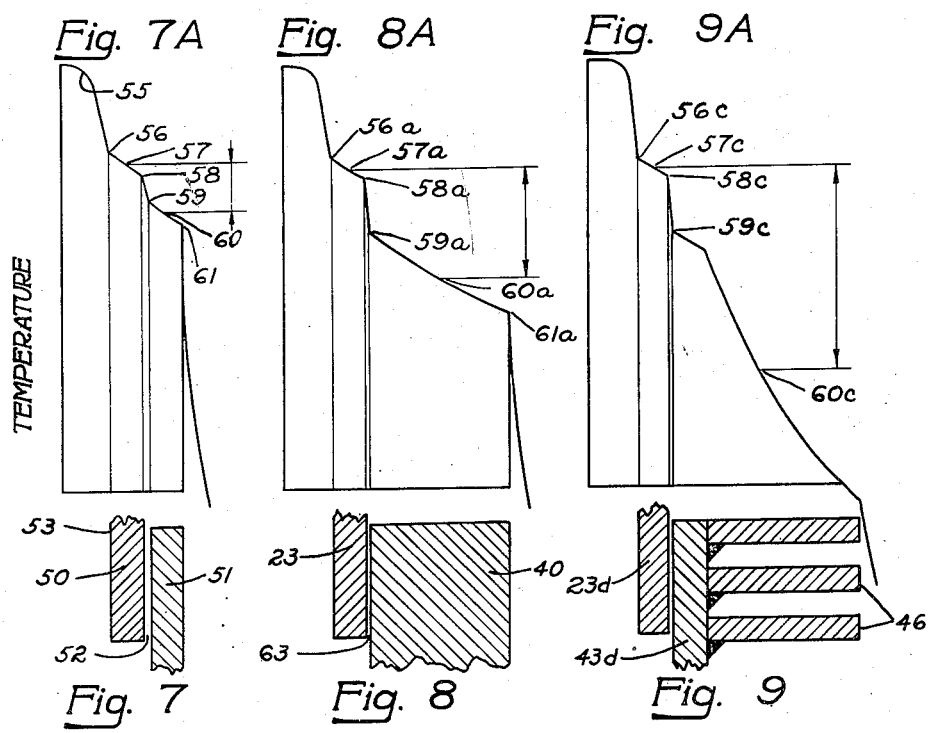
INVENTORS
PAUL A. PITT
HAROLD A. SPRENGER
BY
ATTORNEY

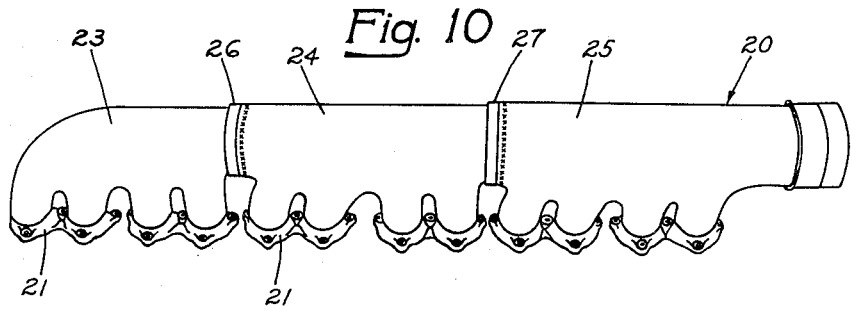
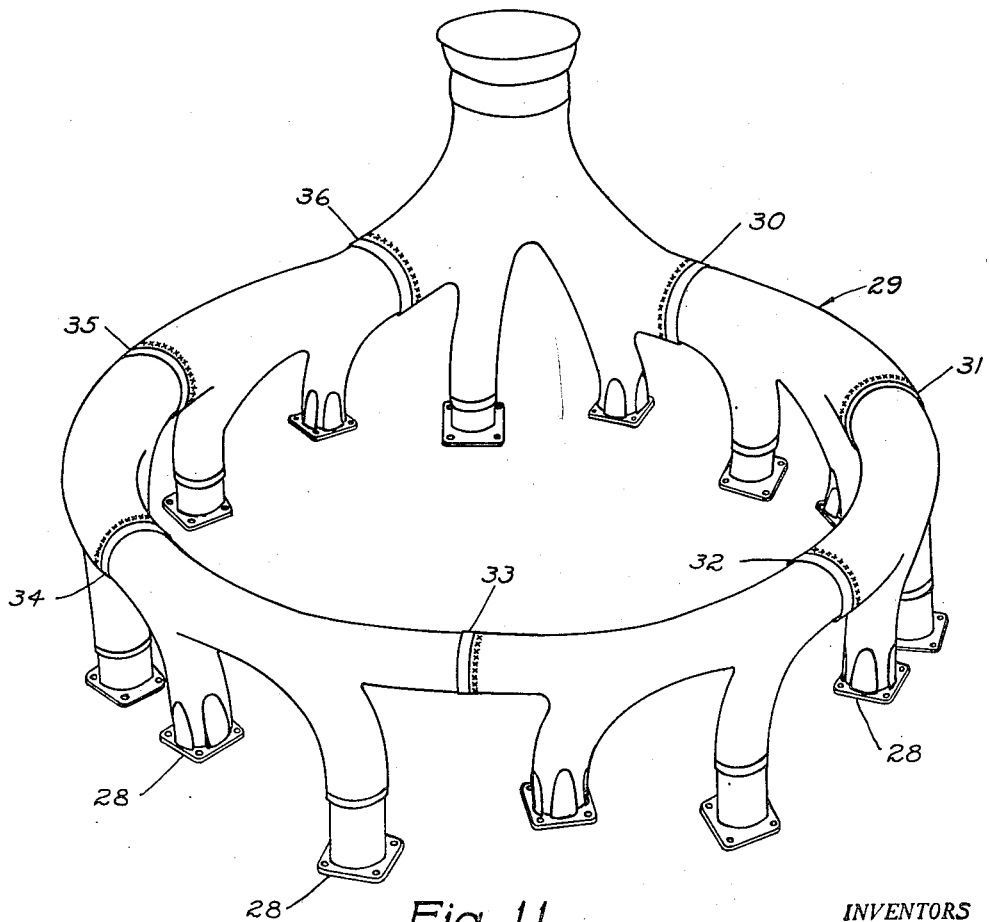

Patented Jan. 11, 1949

2,458,635

UNITED STATES PATENT OFFICE 2,458,635

EXPANSION JOINT FOR EXHAUST STRUCTURES

Paul A. Pitt and Harold A. Sprenger, San Diego, Calif., assignors to Solar Aircraft Company, San Diego, Calif., a corporation of California Application July 10, 1945, Serial No. 604,194

11 Claims. (Cl. 285—183)

This invention relates to expansion joints or connections in conduit structures exposed to wide variations in temperatures, and is particularly useful in exhaust structures for internal combustion engines.

An object of the invention is to provide a joint that is simple, inexpensive, has a long life and provides the necessary freedom of motion without objectionable leakage.

Exhaust structures for aeroplane engines are exposed to wide variations in temperature with resultant expansion and contraction. Furthermore, different portions of the exhaust structures are sometimes supported at widely separated points, and, in that the exhaust structure generally has a higher temperature than that of the supporting engine parts, its expansion from cold to operating temperature may be considerably different from that of the parts upon which the exhaust structure is mounted. For these reasons it is frequently necessary to provide expansion joints between different portions of an exhaust structure, and great difficulty has been encountered in developing structures that would be economical and would prevent objectionable leakage and would have a reasonable life in service. Heretofore the most successful joints of this type have involved the use of an axially expansible material such as flex hose, or the use of relatively slidable cylindrical surfaces with some sort of packing interposed between the rubbing surfaces for reducing leakage, and/or improving the wear characteristics. The packing has, in some instances, consisted of expandable rings, similar to piston rings and in other instances has consisted of fibrous metal packing.

In accordance with the present invention, the use of any type of packing is eliminated, and good sealing and wear characteristics are obtained by making the outer member substantially thicker than the inner member and fitting the parts relatively close together. It is found that by making the outer member relatively thick as compared to the inner member, it runs at a substantially lower temperature than the inner member when it is conducting hot gases. As a result of this increase in the differential temperature between the members, the inner member expands more than the outer member when the structure is conducting hot gases, thereby making the hot clearance substantially less than the cold clearance. This in turn makes it possible to so fit the two members together that there is substantially no clearance between them in the operating temperature range, and hence no leakage during normal operation, while permitting ample clearance at low temperatures for the required freedom. The invention is particularly useful in structures in which a slip joint is required because of the expansion of the conduit at the time the hot gases first start flowing through it, because such expansion is largely completed before the structure attains its normal operating temperature, and during the transition period the clearance between the inner and outer members is larger than it is after normal operating temperatures have been reached.

A full understanding of the invention may be had from the following detailed description of certain embodiments thereof as illustrated in the drawings, in which:

Fig. 1 is a side elevation of a joint in accordance with the invention with a portion of the joint shown in longitudinal section;

Fig. 2 is a detail sectional view corresponding to the portion of the structure shown in section in Fig. 1 but depicting a modification of the structure of Fig. 1;

Fig. 3 is a detail longitudinal section similar to Fig. 2 but showing still another alternative construction;

Fig. 4 is a detail section similar to Figs. 2 and 3 but showing still another alternative construction;

Fig. 5 is a detail cross-section taken in the plane V—V of Fig. 4;

Fig. 6 is a detail longitudinal section similar to Figs. 2, 3 and 4 but showing still another alternative construction;

Figs. 7, 8 and 9 are schematic sectional views illustrating in magnified form the dimensions of the elements of a prior art slip joint, a joint in accordance with Fig. 1, and a joint in accordance with Fig. 6, respectively;

Figs. 7A, 8A and 9A are graphs representing the operating temperatures existing in different portions of the structures shown in Figs. 7, 8 and 9, respectively;

Fig. 10 is a side elevation view of an exhaust manifold utilizing the slip joint of the invention for use on an in-line engine; and Fig. 11 is a perspective view of an annular exhaust manifold incorporating slip joints in accordance with the invention for use on a radial engine.

The present invention is adaptable for use both in universal joints of the ball and socket type and in longitudinal slip joints employing cylindrical bearing surfaces. However, for purpose of illustration, it will be described in connection with longitudinal slip joints.

Referring first to Fig. 10, there is shown a manifold 20 for a twelve cylinder in-line engine having twelve branch ports with flanges 21 adapted to be bolted onto the engine. It is common in such a structure for the exhaust manifold to reach a much higher operating temperature than the engine to which it is attached, and, hence, allowance must be made for the greater expansion of the manifold relative to the engine. Such expansion is provided for in the structure shown in Fig. 10 by forming the manifold 20 in three sections 23, 24 and 25, which sections are intercoupled by slip joints 26 and 27.

The manifold 29 shown in Fig. 11 is annular in general shape and has port flanges 28 adapted to be bolted to the different cylinders of a radial engine. With this construction, since the manifold 29 is in the form of a closed circle, provision must be made for its expansion and contraction and this is again done by introducing slip joints 30, 31, 32, 33, 34, 35 and 36 at spaced circumferential points therein.

Because of the ability of the subject joint to substantially freeze within certain temperature ranges depending upon the clearance and design of the joint, as hereinafter described, these joints produce a new effect not heretofore known.

Were it not for the necessary expansion and contraction it is obvious that a ring manifold without expansion joints would be preferable and would be considerably stronger for a given weight than a manifold constructed with slip joints, but because of the great expansion of the manifild as compared to the engine expansion, joints are necessary. In applicants' manifold, however, the joints freeze within the normal operating temperatures of the aeroplane and the exhaust structure acts substantially as an integral, jointless structure, and is thus materially strengthened against the vibrations experienced in engine operation during the entire period it is at high temperatures. Likewise its period of vibration is changed considerably from that of a fixed ended cantilever, and the amplitudes of vibrations are correspondingly reduced. These features considerably lengthen the service life of manifolds made in this manner.

Heretofore the slip joints employed in manifolds of the type described have consisted of relatively loosely telescoped inner and outer members with some sort of packing interposed therebetween for keeping leakage within reasonable limits. In accordance with the present invention, all packing is eliminated and a superior joint is provided by closely fitting the telescoping members and making the outer member thicker than the inner member so that differential expansion occurs between the members. The differential expansion can be accentuated by providing fins or other cooling structure on the outer telescoping member to increase the radiation or heat therefrom and in that way further reduce the temperature of the outer member.

Referring now to Fig. 1, there are shown two sections of a conduit to be connected which may be the conduit sections 23 and 24 of Fig. 10. Both the conduit sections 23 and 24 may have a wall thickness of 1/16th of an inch and the outer surface of the inner member 23 constitutes one bearing surface of the joint. The other bearing surface of the joint is constituted by a collar 40 which is welded to the member 24 as indicated at 41.

It will be observed that the internal diameter of the member 24 is substantially greater than the outside diameter of the member 23 and that the collar 40 substantially fills the spacing between the members 23 and 24. Furthermore, the collar 40 is of increased thickness at its outer end so that its outer diameter is greater than the outer diameter of the member 24.

In a structure in which the outside diameter of the member 23 is 3.260 inches with a tolerance of $+$ .005 inch, the internal diameter of the collar 40 may be 3.275 inches with a tolerance of a $-$ .005 inch and the collar 40 may have a thickness of approximately .187 inch. These dimensions provide an average radial clearance between the wear surfaces of the joint of about .0075 inch when the structure is cold. It will be observed that whereas the wall of the inner member 23 has a total thickness of 1/16th of an inch or approximately .062 inch, the collar 40 has a thickness of approximately .187 inch which is about three times as great.

It has been found that by making the outer member 40 of the joint thicker than the inner member 23, as described, and smoothly machining the interior surface of the collar 40, the joint gives the required slippage to compensate for longitudinal expansion and contraction of the members 23 and 24 as the structure heats and cools, while substantially preventing leakage of gas at full operating temperature and having a long life in service.

In the modification shown in Fig. 2, the member 23a is substantially the same as the member 23 in Fig. 1, but the outer member 24a is made of smaller diameter than the member 24 so that its inner surface constitutes the bearing surface rubbing against the outer surface of the member 23a. In this instance the additional thickness of the outer member required to provide the desired operating characteristics is obtained by welding a collar 43 of rectangular cross-section to the outer surface of the member 24a at the end thereof.

In the modified structure shown in Fig. 3, the members 23b and 24b are substantially identical with the members 23 and 24 of Fig. 1, but the collar 43 interposed between the parts differs from the collar 40 of Fig. 1 in that it is provided with annular fins or flanges 44 on the exposed portion of its outer surface for increasing the heat radiation.

The structure shown in Figs. 4 and 5 is similar to that shown in Fig. 3, except that the cooling fins 45 extend longitudinally instead of circumferentially.

Fig. 6 shows a modification of the structure of Fig. 3 in which the cooling fins 46 are formed of a different metal than the body 43d of the collar and are welded to the collar. In this instance the main body 43d of the collar may be substantially identical with the collar 40 in Fig. 1.

In the structure shown in Figs 1 through 5, all parts may be made of some heat-resistant material, such as stainless steel or Inconel. In the structure of Fig. 6, the parts 23d, 24d and 43d may likewise be of stainless steel or Inconel, whereas the cooling flanges or fins 46 may be of some material having better heat conductivity, such as aluminum, copper or ordinary iron or steel.

A full understanding of the manner in which the use of an outer member that is thicker than the inner member functions to provide improved results may be had from an examination of the graphs in Figs. 7A, 8A and 9A.

In Fig. 7 a conventional slip joint is illustrated which consists of an inner member 50 and an outer member 51 of the same thickness. The inner member 50 is exposed to the hot exhaust gases on its inner surface, whereas the outer member 51 is exposed to the ambient air. There is always, of course, some leakage of hot exhaust gases through the clearance 52 between the members. The result is that the inner member 50 is heated largely by contact of the hot exhaust gases against its inner surface 53, and to a lesser extent by the leakage gases in the space 52.

The inner member loses heat by radiation to the outer member 51, which in turn loses heat by radiation and conduction into the ambient air. The temperatures at different portions of the structure are shown in the graph of Fig. 7A. The upper end 55 of the graph represents the temperature of the hot exhaust gases within the member 50. The point 56 represents the temperature of the inner surface 53 of the inner member 50. The point 57 represents the temperature at the middle of the member 50 and it also approximately represents the mean temperature of the member 50. The point 58 represents the temperature of the outer surface of the inner member 50. The point 59 represents the temperature of the inner surface of the member 51; the point 60 represents its mid or mean temperature; and the point 61 represents the temperature of the outer surface of the member 51.

It will be observed that the temperature differential between the points 57 and 60 is relatively small, and since this represents the mean differential temperature between the inner member 50 and the outer member 51, the differential expansion of these members will be approximately the same and the clearance 52 between the members will not diminish materially as the structure heats up. Hence, this clearance, which must be made large enough to provide free slippage when the parts are below their operating temperature, will be substantially as large at operating temperature, and substantial leakage will result during operation.

Fig. 8 shows a structure in accordance with Fig. 1 in which the inner member 23 is substantially the same as the inner member 50 in Fig. 7, but in which the outer member 40 is approximately three times as thick. Fig. 8 shows the parts at their normal operating temperature and it will be observed that the clearance 63 between the parts is substantially less than the clearance 52, despite the fact that the clearance when the parts are cold would be the same as shown in Fig. 7.

The reason why the clearance 63 diminishes substantially as the parts reach their normal operating temperatures is apparent from the graph of Fig. 8A in which the points corresponding to the reference points in Fig. 7A bear the same reference numerals with the suffix "a." It will be observed that the temperature differential between points 57a and 60a is much greater than between points 57 and 60. Two facts account for this difference. One is that by virtue of the greater thickness of the member 40, there is a much greater temperature difference from the inner to the outer surface of this member than from the inner to the outer surface of the thin member 51 in Fig. 7. Hence, the mean temperature of the member 40 is substantially lower than the mean temperature of the member 51. Furthermore, by virtue of the lowering of the mean temperature of the member 40 because of its thickness, its expansion is less than that of the member 23, thereby reducing the clearance 63 as the parts heat up. This reduction in the clearance 63 reduces the flow of hot leakage gases through the clearance, thereby further reducing the transfer of heat to the member 40. This accounts for the greater differential in temperature between the points 58a and 59a of Fig. 8A than between the points 58 and 59 in Fig. 7A.

As a result of the reduction in the mean temperature of the outer member 40 because of its greater thickness, the clearance 63 may be reduced substantially to zero, which is desirable in reducing leakage. Furthermore, in many structures, such as those shown in Figs. 10 and 11, it may be desirable if the parts fit so closely together at operating temperatures that free slippage is prevented, because relative movement is necessary only during the transition period between the time when the engine is started and the time when the exhaust structure reaches its normal operating temperature.

When, in the course of the warming-up process, the parts 23 and 40 come into actual contact with each other, heating of the member 40 by leakage of hot gas is eliminated, but as the joint tightens the rate of transfer of heat by conduction from the member 23 to the member 40 increases and produces a corresponding expansion therein, apparently arriving at a point of thermal and pressure equilibrium sufficient to prevent appreciable leakage or movement.

Fig. 9 is illustrative of the structure of Fig. 6, and the graph of Fig. 9A shows the temperatures existing at different portions of this structure during normal operating conditions. Points on the graph corresponding to those in Figs. 7A and 8A bear the same reference numerals but with the suffix "c." It will be observed that because of the cooling flanges 46, the mean temperature of the outer member is even lower than that in the structure of Fig. 8, and the differential between the mean temperatures of the inner and outer members is correspondingly greater. This causes the inner member to close the clearance between the members at a lower operating temperature, after which the increased transfer of heat by conduction between the inner and outer members raises the temperature of the outer member sufficiently to limit the tightening effect.

An example has been given of a structure in accordance with Fig. 1 in which the outside diameter of the inner bearing member was approximately 3.260 inches and the inside diameter of the outside bearing member was approximately 3.275 inches, giving a total difference in diameters of .015 inch. This difference in the diameters varies according to the actual diameters. As a "rule of thumb," it may be stated that the cold clearance should be about .003 of an inch for each inch in diameter of the joint. Naturally in a joint of small diameter, the initial clearances must be smaller than in a joint of larger diameter.

The thin portion of the joints exposed to exhaust gases must be made of special corrosion-resistant materials, such as stainless steel or Inconel. It has previously been indicated that the flanges 46 in Fig. 6 can be made of materials having better heat conduction than stainless steel and Inconel. It is also possible to obtain smaller clearance at working temperatures than when cold, by making a portion of the outer member of a material having a lower coefficient of expansion than the material of the remainder of the structure. Thus where the inner tubes 23a of Fig. 2 and 23d of Fig. 6 are made of 18—8 stainless steel having a coefficient of expansion of $10.2 \times 10^{-6}$, or of Inconel having a coefficient of expansion of $10.0 \times 10^{-6}$, the collar 43 and the flanges 46 can be made of 17 Cr. stainless steel having a coefficient of expansion of $6.7 \times 10^{-6}$, or of 25—12 stainless steel having a coefficient of expansion of $9.6 \times 10^{-6}$.

Because of the tightening of the joints shown in Figs. 1 through 6 at full operating temperature, they have the advantage (in addition to that of reducing leakage) of greatly stiffening the exhaust structure in which they are used. This is particularly desirable in structures such as that of Fig. 11, in which the manifold 29 is supported from the engine by the port flanges 28. It is more essential that the different connections be stiffly interconnected at operating temperatures than at lower temperatures, because the metal is weaker at the high operating temperatures.

Although for the purpose of explaining the invention certain specific embodiments thereof have been described in detail with reference to the drawing, various departures from the exact structures shown can be made without departing from the invention which is to be limited only to the extent set forth in the appended claims.

We claim:

1. An expansion joint for the exhaust line of an internal combustion engine consisting of inner and outer hollow members, the ends of which are in overlapping nested relation with each other, in which the clearance between the overlapping portions of said members is of the order of .002 of an inch per inch of diameter of the members when they are both at atmospheric temperature, and in which the outer member is substantially thicker than the inner member and has its outer surface exposed to ambient air, whereby the outer member runs substantially cooler than the inner member, and the resultant differential expansion substantially eliminates all clearance between the parts after they have attained their normal running temperatures.

2. A slip joint comprising inner and outer telescoping tubular members for interconnecting relatively movable portions of an exhaust line of an internal combustion engine in which: the clearance between said members is substantially zero at full operating temperature; the inner member is fully exposed to gas flowing through said exhaust line and the outer member is fully exposed to ambient air and is sufficiently thicker than the inner member to produce a substantial differential between the mean temperatures of said inner and outer members when conducting hot exhaust gas; whereby the clearance between said members is increased at lower temperatures to provide free slippage therebetween.

3. A slip joint as described in claim 2 in which said outer member comprises a tube of thickness substantially the same as said inner member, and a surrounding collar welded to that portion of said tube in overlapping relation with said inner member.

4. A slip joint as described in claim 2 in which said outer member comprises a tube of substantially the same thickness but of larger internal diameter than the external diameter of said inner member in combination with a collar welded to the outer tube, a portion of said collar being interposed between said inner and outer tubes and the inner surface of said collar constituting the bearing surface of said outer member.

5. A slip joint comprising inner and outer telescoping tubular members for interconnecting relatively movable portions of an exhaust line of an internal combustion engine in which: the clearance between said members is substantially zero at full operating temperature; the inner member is fully exposed to gas flowing through said exhaust line and the outer member has heat radiating fins thereon exposed to ambient air to produce a substantial differential between the mean temperatures of said inner and outer members when conducting hot exhaust gas; whereby the clearance between said members is increased at temperatures lower than normal operating temperatures.

6. A slip joint as described in claim 1 in which said outer member consists of an inner portion in sliding relation with said inner member and an outer portion in contact with ambient air, said outer portion being of a material having a lesser coefficient of expansion than said inner member.

7. An articulated exhaust structure comprising a pair of conduit sections interconnected by a telescoping joint consisting of inner and outer members rigidly connected to the respective sections, in which said inner member expands more than the outer member in response to flow of hot exhaust gas through the structure, and said inner member is dimensioned to have substantially no clearance with and be substantially locked to the outer member at normal operating temperatures when conducting hot exhaust gas, whereby said joint provides free slippage to adjust for longitudinal expansion of said sections during the transition period following initiation of exhaust gas flow, and provides a substantially rigid mechanical connection between said sections after normal operating temperatures have been reached.

8. As an article of manufacture, an articulated exhaust structure comprising a plurality of conduit sections, and slip joint means interconnecting said sections, in which the joint means is so tightly fitted as to be substantially rigid at normal operating temperatures, whereby said structure acts as an integral unit to resist vibration, said joint means comprising inner and outer nested slip members of sufficient strength to be substantially non-expansible by the operating exhaust pressures and the inner member having a larger expansion than the outer member during transition from non-operating to operating temperatures, whereby said joint provides free movement to accommodate longitudinal expansion of said sections below said normal operating temperatures.

9. Apparatus according to claim 1 in which the nested portion of the inner member is of sufficient thickness throughout its length to be substantially non-expansible by the maximum pressure existing in said exhaust pipe.

10. Apparatus according to claim 2 in which the nested portion of the inner member is of sufficient thickness throughout its length to be substantially non-expansible by the maximum pressure existing in said exhaust line.

11. Apparatus according to claim 7 in which the telescoped portion of the inner member is of sufficient thickness throughout its length to be substantially non-expansible by the maximum pressure existing in said exhaust line.

PAUL A. PITT.
HAROLD A. SPRENGER.

REFERENCES CITED

The following references are of record in the file of this patent:

UNITED STATES PATENTS

| Number | Name | Date |
|---|---|---|
| 10,617 | Young | Mar. 7, 1854 |
| 1,013,258 | Wyton | Jan. 2, 1912 |
| 1,302,778 | Dreury | May 6, 1919 |
| 1,437,290 | Coolidge | Nov. 28, 1922 |

FOREIGN PATENTS

| Number | Country | Date |
|---|---|---|
| 55,678 | Austria | Oct. 10, 1912 |
| 402,415 | Great Britain | Nov. 30, 1933 |